United States Patent Office 3,778,322
Patented Dec. 11, 1973

3,778,322
PROCESS OF FORMING SPIRALLY
WOUND PRODUCT
Donald George Keith, Mount Eliza, Victoria, Australia,
Douglas Barrett Morris, Manley, England, Horst Egon
Fred Ludwig Maack, Horgen, Switzerland, and Ernest
Arthur Mason, Frodsham, and Robert John Woolgar,
Northwich, England, assignors to Imperial Chemical
Industries Limited, London, England
Filed Feb. 22, 1971, Ser. No. 117,457
Claims priority, application Great Britain, Feb. 23, 1970,
8,478/70
Int. Cl. B65h 81/00
U.S. Cl. 156—187                            13 Claims

ABSTRACT OF THE DISCLOSURE

Process and apparatus for producing spirally wound products. The process comprises advancing a tubular or rod-like workpiece along its longitudinal axis while rotating it about the axis, by positive drive feeding a flexible ribbon tangentially to the rotating advancing workpiece at a preselected rate and preselected angle of less than 90° to the longitudinal axis thereof such that the resultant spiral ribbon windings form a sheath enveloping a greater cross-sectional area than that of the workpiece, providing a filling material in the space between the workpiece and the spiral ribbon windings and bonding the spiral ribbon windings together or to the workpiece or both.

---

This invention relates to a process and machinery for the production of composite structures, and in particular composite rods or tubes, by helical (or spiral) winding.

In British patent specification 1,151,884, there is described a process for the production of composite tubes which comprises rotating a tube around its longitudinal axis and moving it along said axis, supplying a ribbon coated with a foamable composition tangentially to the rotating tube and at an angle of less than 90° to the longitudinal axis of the tube so that the coated ribbon forms a spirally wound envelope or sheath around the tube with the foamable composition in the annulus, and allowing the foam to expand and cure. In accordance with the process described, the ribbon is drawn on to the tube by the rotational and longitudinal forward movement of the tube and the size of the ultimate foam layer (and hence the overall diameter of the composite tube so produced) is controlled more or less by the amount of foamable composition deposited on the ribbon, the conditions of foaming, and the back tension, if any, exerted on the ribbon. The uniformity of the product, therefore, is dependent upon the maintenance of a steady rate of deposition of the foam forming composition and of unchanging condition e.g. of humidity or temperature, during the foam rise.

According to the present invention, we provide a process for the production of spirally wound products which comprises advancing a tubular or rod-like workpiece along its longitudinal axis while rotating it about said axis, by positive drive feeding a flexible ribbon as hereinafter defined tangentially to the rotating advancing workpiece at a preselected rate and preselected angle of less than 90° to the longitudinal axis thereof such that the resultant spiral ribbon windings form a sheath enveloping a greater cross-sectional area than that of the workpiece, providing a filling material in the space between the workpiece and the spiral ribbon windings and bonding the spiral ribbon windings together or to the workpiece or both. The process is particularly suitable for continuous operation.

While the process is particularly applicable to the use of foamable synthetic resin as the filling material, which composition is allowed to expand and set to provide the composite end product, other filling materials may also be used, e.g. mineral flocks and fibres. Viscous or liquid filling materials may be used if the process is adapted so that the workpiece is fed vertically or substantially so.

THE WORKPIECE

The workpiece may be solid, e.g. as in a rod, or hollow as in a pipe or tube, and is preferably but not necessarily circular or substantially circular or at least symmetrical in cross-section. The workpiece may form an integral part of the composite product or may be withdrawn from the composite product on completion of the process to leave a tube in which case it may be desirable to pre-coat the workpiece with a release agent to prevent adhesion of the filler, e.g. foam, to the workpiece. Hollow workpieces may be self-supporting or not and in the latter case they may be supported during the process e.g. by the provision of suitable cores or, for example, by internal fluid pressure. The cores may be withdrawn from the finished product and may be of the collapsible type to aid withdrawal.

The workpiece is preferably supplied continuously, for example by joining lengths together end-to-end as they are fed to the ribbon winding station. The joining may be of a permanent nature, e.g. by welding, or it may be temporary, e.g. by use of temporary couplings. In the latter case, the composite product of the process may be divided into lengths, e.g. by sawing through the outer spirally wound cover and the filling material at the points of temporary coupling and then uncoupling the workpieces.

In an alternative process, the workpiece may be formed continuously and in situ, e.g. by extrusion using a rotating extruder or by spirally winding one or more plies, if necessary on to a hollow or solid supporting core.

The workpiece may be of any suitable material, e.g. metal, wood, paper, earthenware, ceramic, concrete, cardboard, rubber, glass, textile, plastic, reinforced plastic and resin impregnated fibre; the plastic may be either natural or synthetic and either thermoplastic or curable, and may be foamed, if desired.

The workpiece may itself be of composite, e.g. laminated construction, particularly in the case where it is formed from a number of ply windings. It may also, for example, comprise an end-to-end series of tins, cans or other containers carrying a variety of fillings, e.g. food or other perishable or fragile goods requiring insulation or protection.

The workpiece may be of any desired diameter, e.g. from one inch or even less to several feet.

THE FLEXIBLE RIBBON

The term "flexible," as used herein with reference to the ribbon, means only that the ribbon is sufficiently flexible to be coiled into a sheath of the desired diameter. Thus, for example, stiff ribbons that may be unsuited to coiling into small diameters in accordance with our process may be quite suitable and even desirable for coiling into larger diameters.

The width of the ribbon is not critical but for convenience and ease of operation it is preferred to be such that the angle at which the ribbon is fed to the workpiece is not more than about 75–80° and not less than about 55° to the longitudinal axis thereof. However, foam control, the achievement of an economical rate of production and other factors may require one to operate outside this preferred range of angles.

The ribbon may be formed of any suitable material, e.g. paper, cardboard, woven and unwoven textile, glass fibre, metal, rubber, plastic, reinforced plastic and resin-impregnated fibre. The plastic may be natural or synthetic, and either thermoplastic or curable. If desired, the ribbon may be of composite, e.g. laminated construction, for example as in plastic-coated paper or plastic-coated metal foil.

FOAM-COMPOSITION

While as stated hereinbefore many different materials may be used as the filler, the preferred material is a synthetic resin foam e.g. as based on a foamed or foamable composition.

The foamed or foamable composition may be based on a polymeric material and while the use of thermoplastic polymers such as polyamides, polyesters, polyacetals, polycarbonates, polysulphones and polymers and copolymers of ethylenically unsaturated monomers, e.g. ethylene, propylene, 4-methylpentene-1, styrene, vinyl chloride, acrylonitrile, butadiene and acrylic esters, is not excluded, it is generally preferred to use foamable compositions based on curable polymer systems, e.g. curable polyurethanes, phenol/formaldehyde resins, amine/formaldehyde resins, epoxy resins and compositions of the kind comprising at least one polymerisable vinyl ether containing at least two vinyl groups per molecule as described in British patent specification No. 991,970. The process is particularly suitable for use with polyisocyanurates, e.g. of the kind described and claimed in British patent application Nos. 18,116/65, 17,730/66, 13,250/67 and 7,772/68, whose sensitivity tends to render them difficult to use with, for example, the process of British patent specification 1,151,884.

The composition may be formulated to give rigid or flexible foams, as desired, but rigid foams are generally preferred because of their physical properties such as crush resistance, etc. The foams may also be predominantly open-celled or closed-celled, as desired, it being understood that in general the thermal insulation characteristics are improved with increase in closed-cell content.

The foamable or foamed compositions based on thermoplasts will generally be applied hot, at a temperature above the softening point of the thermoplast, and may be hardened or solidified when the desired extent of foaming has been achieved by allowing them to cool. Foamable compositions based on curable systems, on the other hand, may be applied hot or cold and further heating or cooling may be applied as desired to effect or control cure. Examples of such compositions are those based on polyurethane- and polyisocyanurate-forming mixtures.

THE PROCESS

In accordance with the process of the invention, by positive drive the flexible ribbon is fed tangentially to the rotating advancing workpiece at a rate and angle to the longitudinal axis such that the resultant spiral ribbon windings define a sheath enveloping a cross-sectional area greater than that of the workpiece thus defining a space between the external surface of the workpiece and the internal surface of the sheath in which a filler, e.g. foamable composition, may be placed. In other words, by positively driving the ribbon forward at a specified angle and rate, the geometry of the helically produced sheath is fixed and a space is defined between this sheath and the workpiece which the foamable composition may expand within to fill. This is in clear contradistinction to the process described in the aforementioned British patent specification No. 1,151,884 where the ribbon is drawn on to the workpiece by the rotation thereof and the size of the gap filled by the foam is determined essentially by the extent to which the foamable composition expands. Thus, in the process described in the aforementioned patent specification the foamable composition expands freely and the ribbon adapts itself to sheath it, while in the process of the present invention, the space is defined and the foamable composition expands to fill it. It will therefore be recognised that the process of our invention is more readily adaptable to the continuous production within required limits of tolerance of composite products of a specified and substantially uniform outside diameter irrespective of minor irregularities in the cross-section of the workpiece, the nature or rate of delivery of the foam composition, the conditions extant during the expansion and/or setting of the foamable composition, and any small changes in the back tension of the ribbon, e.g. of the kind that would occur through blocking or sticking on the reel. It is also more readily adaptable to the use of foamable compositions of high sensitivity such as those based on polyisocyanurates.

The spiral ribbon windings may be bonded together and/or to the workpiece by means of the filling material where its nature allows. Thus, in the case of many foamable compositions which are based on polymeric materials and pass through a tacky phase during their expansion and/or hardening, it may be possible to effect a bond along the helical joint line between the axially adjacent spiral windings and to bond these to the workpiece by means of the foam. Alternatively or additionally, the bonding of the ribbon windings to each other may be achieved by other means, e.g. by the use of adhesive tapes, by welding, by glueing or by so shaping the edges of the ribbon that they interlock. Equally, the spiral windings may be bonded to the workpiece by bonding the filling material to the workpiece, e.g. by means of an adhesive, and bonding the spiral windings to the filling material in like manner.

The foam may be provided in the space in any suitable manner but a very much preferred method is to deposit a foamable composition on to the surface of the flexible ribbon at a point before the ribbon is fed on to the workpiece, and to feed the ribbon to the workpiece with the foamable composition between the ribbon and the workpiece. By suitably adjusting the conditions of operating this method, it can be arranged for the foamable composition to lie on a substantially horizontal surface during the critical initial period of rise, thereby ensuring optimum conditions for the production of columnar cells perpendicular to the surface of the ribbon which are a prerequisite for the formation of good quality foam. Most preferably, the surface of the ribbon is maintained substantially horizontal in its travel from the point at which the foamable composition is deposited on it to the point at which it is fed on to the workpiece.

Other methods of providing the foam in the product include, for example, depositing the foamable composition on the outside of the workpiece prior to winding on the ribbon or feeding the composition into the space between the sheath and the workpiece as the former is being formed. In both these methods, however, the rotary motion of the workpiece may create difficulties in obtaining an even deposit because of flow of the composition under the influence of gravity.

Irrespective of the manner in which the foamable composition is provided to form the foam in the space, it is preferred that it is in contact with the surfaces of both the workpiece and the sheath before it is fully set (e.g. cooled or cured as the case may be) in cases where adhesion to both surfaces is desired so that the foam bonds adjacent ribbon windings to each other and to the workpiece. Alternatively, adhesion may be aided or effected by application of a suitable adhesive to one or each surface before it comes into contact with the foamable composition.

In the very much preferred case where the foamable composition is deposited on the ribbon, it is preferred that at least some but not all of the expansion of the foam is completed before the ribbon is fed on to the workpiece so as to reduce or avoid slip between adjacent helices of the ribbon due to excessive further expansion of the foam in the space between the helically wound sheath and the workpiece.

Where it is desired for the axially adjacent ribbon windings to overlap, it is further preferred that the surface of that portion of the width of the ribbon that is involved in the overlap (hereinafter referred to for convenience as the lap width) is free of foamable composition, or substantially so, since otherwise, the composition will be squeezed out of the overlap as the helices are formed and at the least will form an unsightly mark or smear on the outside surface of the composite product. At worst, it may deposit itself on the machinery or even jam it. In order to avoid this, it can be arranged for the composition to be deposited on only part of the width of the ribbon, leaving the lap width uncoated, or alternatively the lap width may be protected during foaming, e.g. by application of a masking tape which may then be removed before winding. On the other hand, it may be desirable to provide a very thin coating on the lap width to act as an adhesive, e.g. by overspray.

It is further preferred where overlapping is desired that the lap width is stretched or expanded to accommodate the overlap so as to avoid crinkling. This may be effected, for example, by creating a thermal differential across the width of the ribbon so that the lap width expands longitudinally with respect to the remaining width and/or is rendered more easily stretchable. Alternatively or additionally, the lap width may be stretched mechanically with respect to the remaining width.

In order to provide an even and uniform deposit of foamable composition on the ribbon, it has been found preferable to deliver it from a nozzle or series of nozzles which reciprocate across the width of the ribbon. By provision of means for adjusting the throw of the reciprocating member, a single delivery device may be used for ribbons of any width and for any desired overlap.

It is, of course, highly desirable to provide sufficient foamable composition to fill the space between the workpiece and the sheath with foam at the desired density. It is very much preferred that the foamable composition is provided in an amount which gives slightly in excess of the desired amount. The use of a substantial excess, however, may result in a foam of substantially reduced physical properties, especially compressive strength and bond strength. In accordance with a further preferment, therefore, the pressure exerted by the foam in the nip between the ribbon and the workpiece is continuously measured and the amount of foamable composition that is deposited per unit area of the ribbon is adjusted to maintain the pressure between predetermined limits.

The means for feeding the ribbon forward at the desired rate is preferably situated at a point as near as possible to the longitudinal axis of the workpiece so as to obtain the maximum control. Where the ribbon is coated with foamable composition, the driving force can with ease only be applied to the under-surface of the ribbon if damage to the foam and/or clogging of the machinery is to be avoided. This may be achieved, for example, by use of a feed device co-operating with the under-surface of the ribbon by application of vacuum, as described more fully hereinafter.

The driving force or forces for applying the combination of forward and rotary motion to the workpiece and to the composite product may be applied either to the workpiece at a point before the ribbon is fed on to it, or to the product, or both, as convenient. There are inherent problems, associated with the state of the foam layer in the product, which create difficulties in applying a driving force to the product without damaging the foam, and while we have devised machinery which is capable of driving the product without causing this damage it may often be preferred to apply the drive only to the workpiece before the foam is applied. However, where the workpiece is being formed in situ, e.g. by spirally winding one or more plies or by use of a rotary extruder, it may be impossible or inconvenient to drive the workpiece, and the drive may then have to be applied to the composite product. Where possible, it is much preferred to drive both the workpiece and the composite product synchronously so that there is substantially no torque on the workpiece/composite product at the point where the ribbon is fed on to it (the winding station), thereby reducing any torsional stress on the foam at this point.

Heating the foamable composition and/or heating or cooling the composite product may be found desirable in order to accelerate and/or provide a further degree of control of the rise and setting of the foam.

The composite product is preferably sawn up into lengths when the foam is in a sufficiently stable state to be handled and the lengths may also be sawn lengthwise, if desired, e.g. to provide arcuate lagging sections for pipes.

THE MACHINERY

In accordance with a further embodiment of the invention, machinery is provided for the production of composite products by the method hereinbefore defined comprising in combination (i) support means for the machine components, (ii) means for supporting a rod-like or tubular workpiece, (iii) means for continuously moving said workpiece along its longitudinal axis past a ribbon winding station, (iv) means for simultaneously rotating said workpiece about its longitudinal axis, (v) continuous supply means for a flexible ribbon, (vi) drive means for feeding the ribbon forward to the rotating advancing workpiece at the ribbon winding station at a preselected rate, (vii) means for guiding the ribbon tangentially on to the workpiece at a preselected angle of less than 90° to the longitudinal axis thereof at the ribbon winding station, (viii) means for providing a filler material, especially foam, in the space between the workpiece and the sheath formed therearound by the spirally wound ribbon, and (ix) guide and support means for the composite product so formed.

In a much preferred embodiment where the filler material is foam, the means for providing foam in the space between the workpiece and the sheath formed from the ribbon comprises means, situated on the path of the ribbon between its point of supply and the winding station, for depositing a controlled quantity of a foamable composition on the ribbon. In this embodiment may also be provided (a) means for controlling the width of the deposit on the ribbon so as to leave uncoated part of the width adjacent one edge (hereafter referred to as the lap width) for overlap if desired; (b) means for extending the lap width longitudinally with respect to the remaining width, e.g., by thermal expansion and/or by mechanical means so as to accommodate the overlap, and/or means for rendering the lap width relatively more easily stretchable than the remaining width, e.g. by thermal treatment; and/or (c) means for controlling the temperature of the foamable composition deposited on the ribbon and possibly also for thermally treating the ribbon before the foamable composition is deposited on to it.

Where the ribbon is of a material having an adequate thermal coefficient of expansion, the means for extending the lap width with respect to the remaining width of the ribbon may comprise means for causing a suitable temperature differential across the width of the ribbon. The desired differential can readily be calculated from knowledge of the intended diameter of the sheath and the thickness and coefficient of thermal expansion of the ribbon.

Alternatively or additionally, mechanical means for differentially extending the ribbon across its width may be provided. For example, the ribbon may be passed under tension through a bank of e.g. frusto-conical rollers arranged to stretch the lap width of the ribbon with respect to the remaining width. If desired the lap width may be thermally treated to render it more easily stretchable before it is subjected to the mechanical treatment.

Preferably, the means for depositing the foamable composition comprises at least one foam composition delivery nozzle adapted to reciprocate across the width of the ribbon, and means for reciprocating it. The position of nozzle may also be adjustable in the direction of travel of the ribbon.

Any suitable means may be provided for controlling the temperature of the foamable composition on the ribbon. For example, heaters or cooling means may be provided above and/or below the ribbon and may be arranged to provide a temperature gradient along, across and/or through the depth of the foamable composition. The ribbon may also be preheated before it receives the foamable composition. If desired, the ribbon may be passed through a temperature controlled enclosure before and/or after the foamable composition has been deposited on it.

The ribbon may also be supported during the deposition of the foam composition and/or subsequently up to or near the point at which it is fed to the workpiece. Conveniently it is supported and located laterally on a table which is pivotable in a horizontal plane about the workpiece where the ribbon is fed to the workpiece. Most suitably, it is pivotable about a vertical axis which passes through the longitudinal axis of the workpiece and the center line of the ribbon where it is fed on to the workpiece, thereby providing a means of controlling the angle at which the ribbon is fed to the workpiece. Preferably, the table is slightly convexly curved along its length thereby aiding maintenance of continuous contact between the ribbon and the table and the avoidance of air pockets, and also reducing the danger of the edges of the ribbon curling up.

The means for feeding the ribbon to the workpiece is preferably sited as near as possible to the point at which the ribbon is guided on to the workpiece. Profitably, the feed means may be pivoted in a horizontal plane about the workpiece where the ribbon is fed to the workpiece. Ideally, it is pivotable about a vertical axis which passes through the longitudinal axis of the workpiece and the center line of the ribbon where it is fed on to the workpiece, thereby providing further and potentially more positive control of the angle at which the ribbon is fed to the workpiece. To this end, the feed means may be located on the table. Means may also be provided responsive to incoming information consisting of the desired outside diameter (D) of the composite product and the effective width ($w$) of the ribbon (that is the width of the ribbon less that used for overlap, if any, to automatically set the angle $\theta$ at which the ribbon is fed to the workpiece in accordance with the relationship $\cos \theta = w.(\pi D)^{-1}$.

Where the ribbon carries a coating of foamable composition, the feed means is preferably a vacuum haul off device, for example, an impeller, e.g., an endless belt, to which the under-surface of the ribbon is applied by vacuum suction, thus avoiding contact with the coated surface of the ribbon and possible damage to the foam or clogging of the machinery.

In accordance with a preferred embodiment, the feed means comprises a frame carrying (i) a vacuum box open at the top, (ii) beyond opposite ends of the box parallel rollers for supporting an endless belt, (iii) means for driving at least one of the rollers, (iv) an endless belt of porous or perforated material adapted to travel across the open top of the vacuum box, (v) preferably a vacuum seal between the top edges of the box and the belt, and (vi) means for connecting the interior of the box to a vacuum pump. Preferably, the top of the box may be closed by a perforated or slotted sheet or else the box is provided with longitudinal ribs, in order to provide additional support for the belt during its travel across the box.

Any suitable drive means may be used for moving the workpiece past the ribbon winding station and for rotating it, and the drive may be applied to the workpiece at a point prior to the ribbon winding station and/or to the composite product at a point beyond the ribbon winding station. The drives may comprise, for example, lapped belts or skew rollers but in a much preferred embodiment, the rotary and linear motions are applied to the workpiece and/or the product by independent and separately isolatable means.

In accordance with this preferment, the drive assembly for the workpiece or product comprises (a) a base having mounted thereon
(b) a first unit and a second unit through each of which the workpiece or product may move along its longitudinal axis, each of said units being separately rotatable about said axis, and
(c) means for rotating each of said units around said axis, and wherein the first unit has mounted thereon means for propelling the workpiece or product along its longitudinal axis, and the second unit is co-operatively engaged to the propelling means whereby in operation the propelling means is set in motion by causing relative rotary motion between the first unit and the second unit and the speed of the propelling means is proportional to the difference in the rotational speeds of the first and second units.

Preferably the units of the drive assembly are capable of being synchronously coupled whereby at any linear throughput velocity of rotational speed the pitch of the helical path along which the surface of the workpiece or product is moved remains constant. For example, the drive to each of the two units may be taken from a common drive shaft, there being a variable speed unit, e.g. a Kopp variator, between one of the unit drives and said drive shaft or between the unit drives whereby the setting of the variable speed unit determines the pitch of the helix. While said units preferably have this capability of synchronous operation, it will readily be appreciated that rapid synchronous changes of pitch may also be achieved thereby allowing for fine pitch control while running.

In a preferred embodiment of the drive assembly, the means for propelling the workpiece or product along its longitudinally axis comprise a plurality of impellers radially disposed relative to the axis of rotation of the first unit. Preferably there are at least three such impellers, e.g. disposed at 120° to each other. Each impeller may comprise, for example, one or more rollers or, more preferably, endless belts, thereby allowing the pressure necessary for gripping the device to be distributed over a large surface area thus reducing the danger of local overloading and aiding the handling of delicate and fragile workpieces, e.g. thin walled tubes and composite products containing a foam filling in the walls.

In yet a further preference, means are provided for adjusting the distance of each impeller from the rotational axis of the first unit whereby workpieces and products of non-circular, polygonal, or even asymmetric cross-sectional sizes and shapes may be accommodated. In another preferred embodiment means are provided for adjusting the distance of each radially disposed impeller from the rotational axis of the first unit simultaneously with the distance of each other impeller therefrom, thereby providing an automatic centering facility which is especially desirable in many applications.

In accordance with a still further preferment, the driving surfaces of the means for propelling the workpiece, e.g. the radially disposed impellers, are resilient, thereby tolerating some girth variation in the workpiece. For example, the impellers may comprise endless belts with a resilient, e.g. foam rubber, driving layer or a plurality of resilient driving pads. Given sufficient resilience, even flanged tubes may be treated using our machine. Thus, in accordance with the preferred embodiment, a rotary drive assembly is provided which may drive invariantly on a helical path whose diameter is larger than the greatest cross-section of the workpiece or product to be driven and couples to the said workpiece or product by resilient or compliant facings which will tolerate a range of girth variation in the workpiece or product.

In a convenient embodiment, the second unit of the drive assembly comprises an annular wheel (that is, a ring gear with the teeth facing inwards) which is co-operatively engaged to one or more, and preferably all, of the radially disposed impellers (or groups of impellers) by means of associated epicyclically disposed pinions which are drivably coupled to the impellers, or groups of impellers, e.g. by bevel gears.

Two such drive assemblies may be used, one sited before the ribbon winding station and adapted to drive the workpiece and one sited beyond the ribbon driving station and adapted to drive the composite product. By this means, the potentially disruptive influences of, for example, coupling up workpieces for feeding to the winding station or sawing up the product, may be isolated from the ribbon winding station thus improving the uniformity of the product. To minimise torque effects, the two drive assemblies are preferably coupled so that the means for advancing the workpiece to the ribbon winding station and the means for withdrawing the composite product from the ribbon winding station operate at the same linear velocity, and the means for rotating the workpiece and composite product operate at the same rotational speed. It may also be desirable to couple the linear drive means synchronously with the rotational drive means thereby ensuring the maintenance of constant pitch during any change of linear throughput or rotational speed.

It will be recognised that the drive assemblies described above are particularly well adapted to be coupled together since unlike skew drives or lapped belts their operation is not upset by any change in diameter of the workpiece or composite product.

Figure 1:
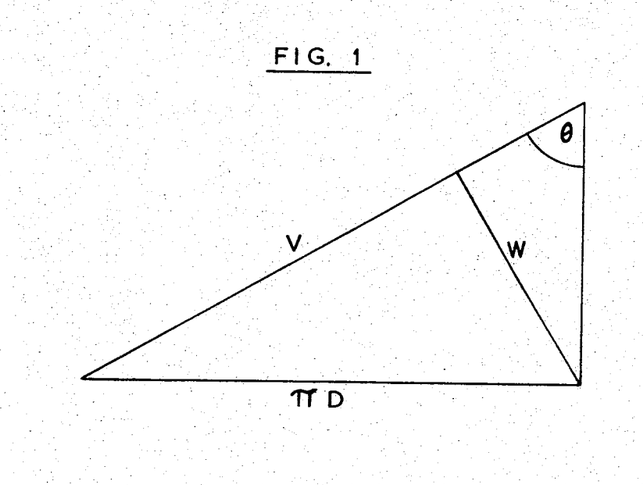

To provide additional control of the process, preferably means are also provided for coupling the means for rotating the workpiece and/or composite product in the appropriate drive assembly with the means for feeding the flexible ribbon to the workpiece whereby for any given outside diameter for the product and any given width of the ribbon, the flexible ribbon is supplied at the correct rate for any speed of rotation of the workpiece or product. The association between these parameters may be derived by reference to FIG. 1 of the drawings accompanying the provisional specification and is to the effect that the rate at which the ribbon is to be supplied is determined by the relationship $$V = \pi D . (\sin \theta)^{-1}$$

where $v$ is the length of ribbon required per revolution, $D$ is the desired outside diameter of the composite product and $\theta$ is the angle at which the ribbon is fed to the workpiece (i.e. the included angle between the long axis of the ribbon and the longitudinal axis of the workpiece), and $$\cos \theta = w . (\pi D)^{-1}$$

where $w$ is the effective width of the ribbon (i.e. width of ribbon less width of overlap, if any).

Futher control may be obtained by providing means for sensing the pressure of the foam in the nip between the ribbon and the workpiece and means for controlling the amount of foamable composition deposited per unit area of ribbon to maintain said pressure within predetermined limits. In accordance with one method of achieving this, resiliently mounted means are provided for displacing the ribbon from its natural straight line path between the ribbon drive means and the point where the coating of foam on the ribbon first comes into contact wtih the workpiece, said means being movable to increase or decrease the displacement of the ribbon from said straight line path, and the position of said means being adjusted such that at a given positive displacement, the displacing force exerted by said means is just equal to the counter force exerted by the desired foam pressure (or thickness) at the nip so that any increase or decrease in the foam pressure (or thickness) at the nip is reflected by a change in the position of said displacing means. Conveniently the displacing means may be a roller, plate or bar mounted transverse the ribbon and in contact with the undersurface thereof and may be spring loaded or operatively connected to a load cell. The position of said displacing means may be indicated visually by a pointer on a dial and/or any change in position of said means beyond predetermined limits may be indicated visually or audibly, e.g. by lights or bells. Preferably, however, the system is self adjusting by providing means responsive to any change in position of said displacing means from its median position for adjusting the rate of deposition of foam composition per unit area of ribbon to restore said displacing means to its medium position.

For use in the process of our invention wherein the workpiece is continuously formed in situ by extrusion, the machinery of the invention additionally comprises anterior to the ribbon winding station a rotary extruder.

For use in the process of our invention wherein the workpiece is continuously formed in situ by spiral winding of one or more plies, the machinery of the invention additionally comprises anterior to the ribbon winding station means for continuously supplying one or more plies of flexible material and means for forming said ply or plies into a spirally wound tube.

A mandrel may be provided for supporting a hollow workpiece up to and/or at or beyond the ribbon winding station. In order to aid the continuous withdrawal of the workpiece from the mandrel, the latter may be tapered. Alternatively, it may be porous for at least part of its length and be connected to pressurised fluid supply means to provide a fluid lubricating layer between the outer surface of the mandrel and the inner surface of the hollow workpiece. Suitably, the mandrel has a non-porous head and porous tail and the tail is of slightly smaller cross-section than the head. The mandrel is particularly useful in the treatment of non-self-supporting tubular workpieces such as tubes spirally and continuously wound from paper ply immediately prior to the treatment station. It may be rotatable, if desired, and may rotate freely or be driven at a rotational speed at least equal to that of the workpiece it supports. A suitable mandrel is described in our copending application No. 9,956/69.

The invention is now illustrated with reference to preferred embodiments thereof and with the aid of FIGS. 2 to 9 of the drawings accompanying the provisional specification in which.

Figure 2:
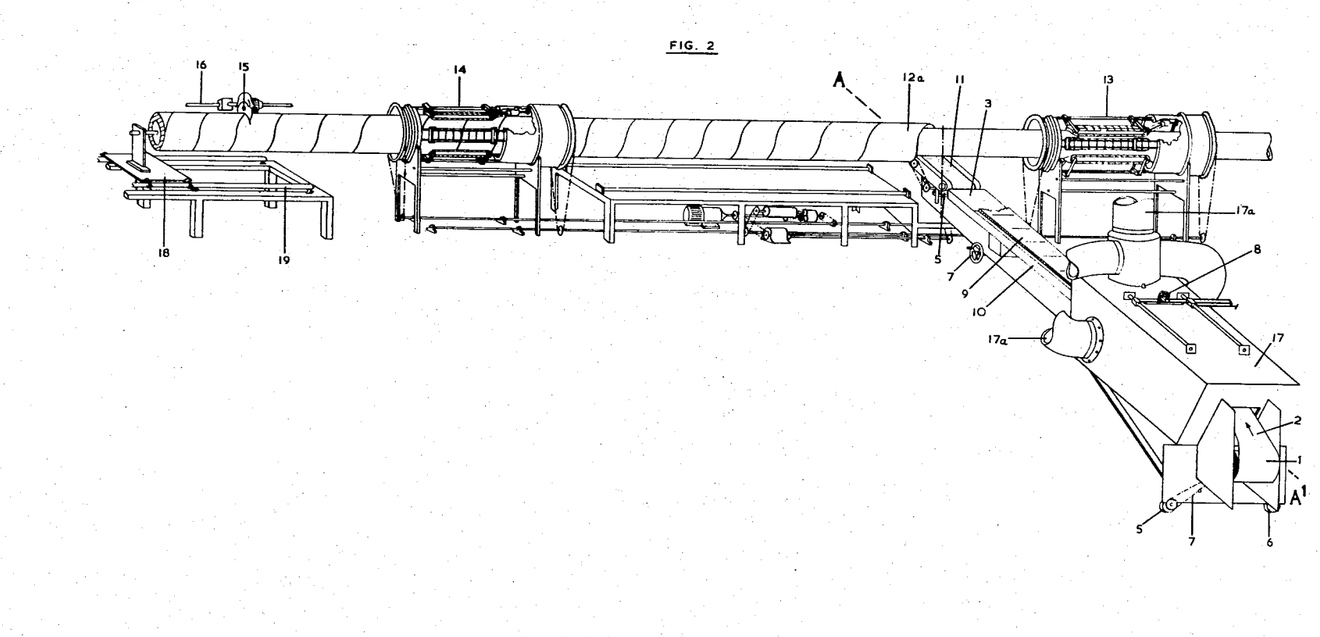
FIG. 2 is an isometric sketch of one form of machine suitable for use in the process of the invention with parts of some components cut away to expose their internal construction.

Referring to FIG. 2, numeral 1 is a roll of ribbon on which the ribbon is stored and from which it is delivered, 2 is the ribbon being fed in the direction of the arrow from the roll on to a table 3 on a frame 4 which is pivoted at the midpoint of one end directly under the longitudinal axis of the advancing workpiece at 5 and the other end of which is free to rotate round the pivot point on wheels 6 at least one of which is driven by a handwheel 7 via a worm and pinion (not shown), shaft 7a and chain and sprockets generally identified as 7b. Attached to the table is a canopy 17 through which the ribbon passes and mounted on the canopy and indicated generally by reference numeral 8 is the foam dispensing means described in more detail below with the aid of FIG. 7. The nozzle of the foam dispensing means projects into the canopy as shown and vents 17a, which are attached to extractor pumps (not shown), are provided for removing any vapours and overspray from the foamable plastic composition. The vents are arranged to prevent buildup of overspray on the sliding surfaces of the foam-dispenser to avoid clogging the moving parts. 9 is the foam-forming composition deposited on the surface of the ribbon leaving part 10 of the width uncoated for use as the overlap for adjacent ribbon windings. The coated ribbon may be heated by heaters (not shown) which may be above or below the table between the foam dispensing means and the workpiece, and is driven forward by a vacuum feed device, generally indicated by reference numeral 11, which is attached to the table and is described in more detail below with the aid of FIG. 6.

The coated ribbon then passes around an advancing tubular or rod-like workpiece, e.g. a plastic tube, 12, to form a composite product 12a which in the case illustrated is of regular annular cross-section. The angle between the table 3 (and hence the ribbon 2) and the long axis of the workpiece 12 is such that successive windings of the foam coated width of ribbon do not overlap but are closely adjacent and preferably abut each other; the gap, if any, between them being not greater than the width of the uncoated width of ribbon which overlaps the preceding winding.

Figure 3:
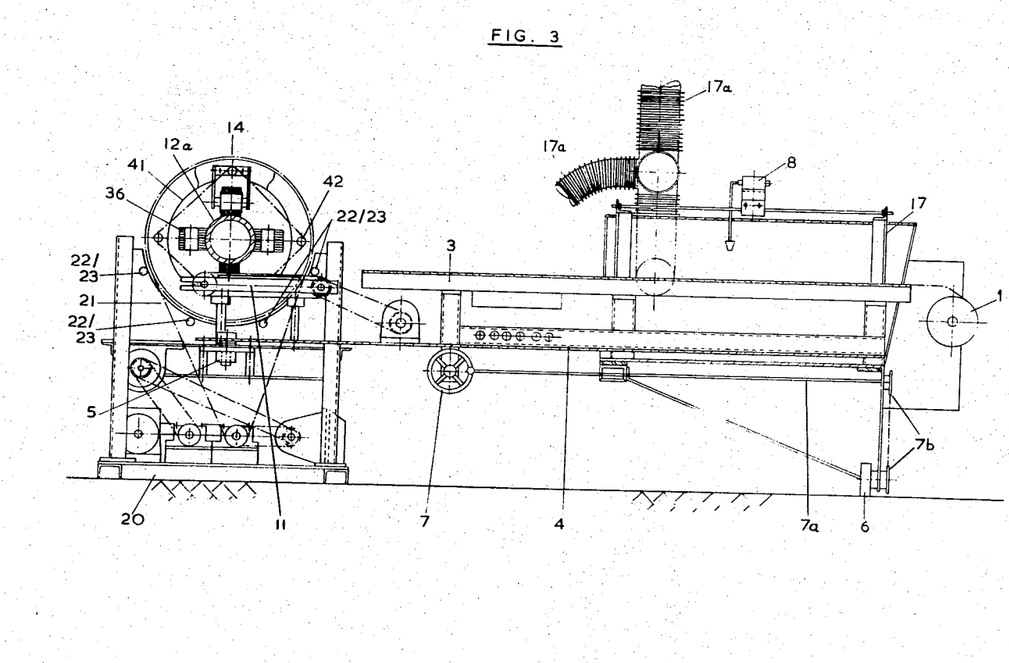
FIG. 3 is a cross-section through the machinery along the line AA' of FIG. 2, FIG. 4 provides a detailed cross-sectional side elevation of the drive assembly identified generally by reference numeral 14 in FIG. 2.
Figure 4:
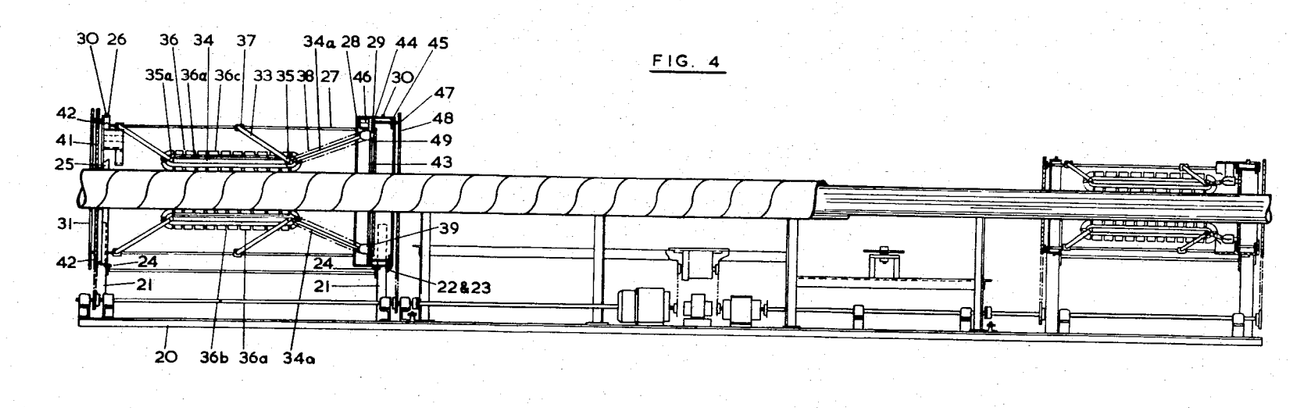
Figure 8:
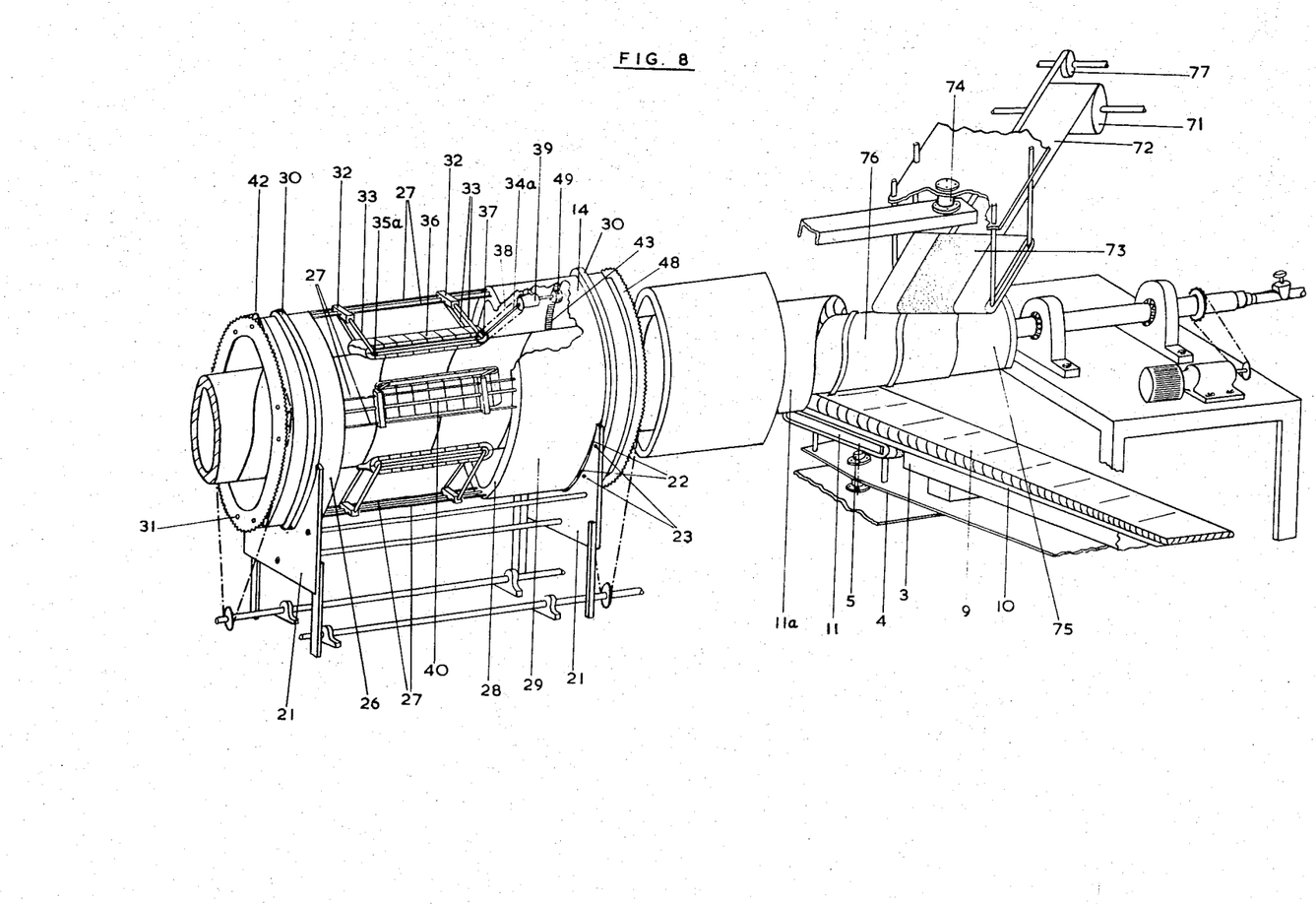
FIG. 8 is an isometric sketch of one form of machine adapted to the continuous production of the workpiece in situ by the spiral winding of a ply, with parts of the machinery cut away to show their internal construction.

The workpiece is supported by and fed to the winding station with a combination of linear and rotary motions by a first drive assembly indicated generally at 13. Subsequent to the application of the foam coated ribbon, the thus coated workpiece is supported and withdrawn from the winding station by a second drive assembly 14 the rotary and linear progression components of which are preferably coupled to the corresponding components of the first drive assembly. The detailed construction of one of the rotary drive assemblies is shown in FIGS. 3, 4 and 8, and described further below.

Optionally, the product may be heat treated e.g. by use of an oven (not shown), and may be sawn into lengths by saw 15 pivotable on shaft 16 and adapted by means not shown to travel with the product while sawing through it.

For example, the saw may be mounted on rails so that it may travel alongside the composite product and may be linked to an abutment which is engaged by the front end of the product and moved by it. Actuation of the saw may be by microswitch triggered by the passage of the composite product or may be on a time switch basis. On completion of the sawing, the saw will be retracted speedily to its rest position ready for the next cut.

The product is supported by a plug which fits into its end, the plug being mounted on a trolley 18 running on rails 19.

THE DRIVE ASSEMBLIES

A suitable drive assembly for the workpiece and the composite product is now described in more detail and with reference to FIGS. 3, 4 and 8. Each drive assembly generally represented by reference numerals 13 and 14 in FIG. 2 comprises a base consisting of a base plate 20 carrying two saddle end plates 21, the upper surface of each of which is concave arcuate to receive a cylindrical body rotatable about its axis which is horizontal. At a plurality of points round the radius of the arc are mounted horizontal eccentric pins 22 carrying load-bearing ball races 23. Accurate positioning of the ball races to receive the cylindrical body may be achieved by adjustment of the positions of the eccentric pins.

At the bottom centre of the arcuate top surface of each saddle plate, there is an embrasure in which is mounted a thrust bearing 24 on a vertical axis.

Rotatably mounted on the saddle plates and supported by the load bearing ball races 23 is the first rotatable unit, or cage, which comprises an annular frame 26 linked by radially disposed parallel pairs of tie rods 27 to the inwardly projecting annular flange or end plate 28 of a cylindrical housing 29. The annular frame and the housing each rest on the load-bearing ball races 23 mounted in the saddle end plates of the base and the unit is located laterally by outwardly projecting circumferential rails 30 on the annular frame and the housing which co-operate with the thrust bearings 24 on the saddle end plates. The entire cage is rotated by means of a sprocket 31 attached to the annular end part 26 and driven through a chain and second sprocket by a motor not shown.

The propelling means comprise a series of impellers each of which is slidably mounted on a pair of the tie rods 27. In each case the assembly comprises a pair of slippers 32, and pivotably mounted on each slipper a pair of parallel drop arms 33. The pairs of drop arms support between them at their free ends a frame 34 which lies parallel to the cage axis and has at each end an axle on which is mounted a roller 35, 35(a). The rollers support an endless gear belt 36 which runs parallel to the cage axis and is backed by a platen 36a along its inner run (that is, that part of its run which is nearer the axis of the cage). Roller 35 is drivably connected by means of a sprocket 37 (see FIG. 8) and chain 38 to a second sprocket driven by bevel gear 39 mounted on the inner wall of the cylindrical housing 29. The frame 34 is pivotable about an axis passing through the centre of the second sprocket by means of a radius arm.

The endless belt comprises a substantially inelastic incompressible backing belt 36b on the outer surface of which is a series of resiliently compressible foam rubber pads 36c. This arrangement provides the tolerance to accept some change in the cross-sectional size of the workpiece or product without requiring any alteration to the positioning of the impeller relative to the axis of the unit. In particular it allows flanged, spigotted and ribbed workpieces such as flanged pipes to be handled. The inwardly facing surface of the belt is ribbed for co-operation with outwardly projecting ribs on the driving roller for positive drive. The distance of the endless belt from the axis of rotation of the cage is determined by the location of the slippers 32 on the tie rods 27. The slippers may be adjustably and lockably located, for example, by means of the threaded rod 40 (see FIG. 8).

The cage preferably carries at least three, and preferably four impellers (as shown, for example in FIG. 3), in radially disposed positions. If desired, the position of all the impellers relative to the axis of the unit may be adjusted simultaneously by means of an endless chain 41 co-operating with sprockets 42 fixed on the end of each threaded rod 40, and driven by a motor or a handwheel. Alternatively, the positions of the impellers may be adjusted separately whereby rods, pipes and tubes of noncircular, polygonal or even asymmetric cross-sectional shape may be accommodated.

Rotatably mounted in the cylindrical housing 29 of the cage is the second unit. This comprises an annular wheel 43 (that is a gear ring with the teeth facing inward) located by means of ball races 44, 45, mounted on pins located around the circumference of the wheel, bearing respectively on inwardly facing circumferential rail 46 on the inside wall of the housing and the flanged end 47 of the housing. The annular wheel is attached to a sprocket 48 drivably connected to a motor by a chain and sprocket and meshes with epicyclic or planet gears 49 each of which is drivably connected to the bevel gear 39 which in turn is drivably connected by chain and sprockets to the driving roller for one of the endless belts as previously described.

Figure 5:
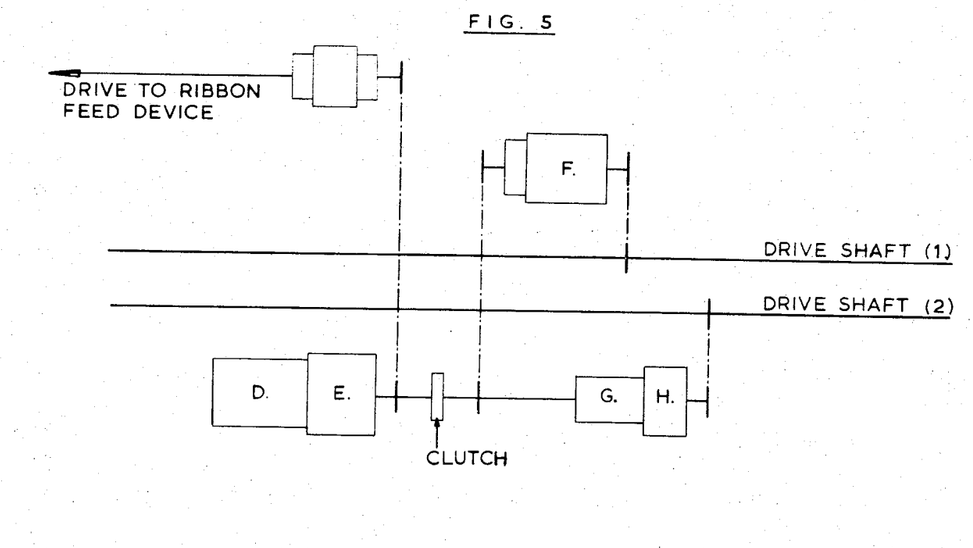
FIG. 5 shows one method of coupling the drive assembly for the workpiece with the drive assembly for the composite product and of coupling one of the drive assemblies with the ribbon feed means.

Referring to FIG. 5, the power for driving the assembly may be provided by a motor D through two variable speed gearboxes E and G. The power offtake for the cage (or first unit) is taken from the driven shaft of the first variable speed gearbox E, via a further reduction gear F while that for the second unit (annular wheel) is taken from the driven shaft from the second variable speed gearbox G, if desired via another reduction gear H.

As described in more detail below the drive to the ribbon feed device may also be taken from the same motor in which case it is desirable to provide a clutch between the drive to that device and the drives to the drive assemblies so that sequential start up of these is possible.

In the machinery as shown in FIG. 2, the drive assemblies are mounted one anterior to and the other beyond the ribbon winding station. Preferably they are coupled together so that the drive to the cages in the two assemblies are coupled to operate at the same rotational speed and the drives to the annular wheels in the two assemblies are coupled to operate at the same rotational speed. Thus, referring to FIG. 5, drive shaft (1) is connected to the cage (or first unit) of each drive assembly and the drive shaft (2) is connected to the annular wheel (or second unit) of each assembly.

Alternatives to the drive assembly means exemplified in the embodiment described above and illustrated in FIGS. 3, 4 and 8 will be apparent to those skilled in the art. For example, the sprocket and chain drives to the cage and annular wheel may be replaced by circular racks and appropriate gear trains; the endless belts may be replaced by linearly arranged sets of rollers; the bevel gear between the annular wheel and each endless belt may be replaced by worm and pinion gears; the annular wheel may be replaced by a circular rack; the means for adjusting the distance of each endless belt from the rotational axis of the cage may be hydraulic; the resilient pads on the endless belts may be profiled to the outside shape of the workpiece. In yet a further alternative, means may be provided for adjusting the disposition of the impellers (endless belts) around the circumference of the cage. For example, 24 alternative positions may be provided at 15° intervals around the cage, up to (say) any 8 of which may be occupied. Thus, for instance, for handling a workpiece of circular cross-section or for handling hexagonal or dodecagonal workpieces, 6 positions may be occupied at 60° intervals; for handling square, rectangular, octagonal or dodecagonal workpieces, 4 or 8 positions may be occupied at 90° or 45° intervals. In another, and preferred alternative, the distance of each impeller from the rotational axis of the cage may be adjusted without changing its longitudinal position, e.g. by suspending each impeller from a pair of tie rods by a pantographic linkage.

In operation, the position of each radially disposed impeller on the first drive assembly is adjusted to accommodate the workpiece, e.g. rod, pipe, tube or channel, and the position of each radially disposed impeller on the second drive assembly is adjusted to accommodate the composite product, which will be larger in cross-section than the original workpiece. The gearboxes E and G are then set to provide the required rotational and longitudinal speeds and the motor is switched on.

It will be understood that if the cage in each device is kept stationary and only the annular wheel is rotated, no rotational movement will be transmitted to the workpiece or product which will simply be moved forward along its axis. Similarly, if the cage and annular wheel are rotated at the same speeds, the workpiece or product will be rotated without any linear progression. Thus, by suitably operating the variable speed gearboxes, e.g. Kopp variators, the workpiece or product may be moved with any desired combination of linear and rotational rates up to the maximum rates of linear motion and rotation possible on the machine.

By the use of coupled drive assemblies, the workpiece may be substantially isolated from the influence of outside forces while it is being treated at the ribbon winding station. Furthermore, provided the distance of each radially mounted impeller from the axis of the cage in each assembly is adjustable the assemblies can readily accept workpieces of widely varying size and cross-sectional shape. In particular, workpieces of irregular cross-sectional shape may be accommodated as may composite products which differ from the workpiece not only in cross-sectional size but also in cross-sectional shape. Provided there are at least three radially disposed impellers in each unit, and the distance of each set of impellers from the axis of the cage is synchronously adjustable, the machinery also has automatic centering capabilities. Another advantage is that the drive assemblies may be coupled and uncoupled with ease and may be arranged to operate either at constant pitch or at constant linear or angular velocity and variable pitch. In the much preferred case where the impellers have resilient driving surfaces, e.g. as in the case of endless belts with foam rubber pads, workpieces of variable girth may be accommodated without the machinery jamming or getting out of phase. In particular, the assemblies may then accommodate flanged and spigotted pipes and tubes, and pipes and tubes having radial ribs or other protuberances. Furthermore, the provision of this resilience allows for very delicate handling thereby allowing the assemblies to be used with workpieces and composite products of fragile construction. At the same time, the machinery is also robust thereby allowing the handling of heavy workpieces and composite products and hence providing very great versatility.

These and other advantages make the drive assemblies described above particularly suitable for use in the treatment of workpieces in accordance with our invention. In the formation of spiral windings by feeding a ribbon onto a rotating advancing rod-like or tubular workpiece, for example, any inadvertent change in speed of advance or speed of rotation of the workpiece may upset the winding, possibly rendering the article valueless and even damaging the ribbon and/or jamming the machinery. The occurrence of such inadvertent changes is substantially reduced by the use of the assemblies in coupled operation. Furthermore, by use of these drive assemblies the application of any undue compressive, shear or torsional force to the foam at the nip between the ribbon and the workpiece is substantially reduced thereby reducing the danger of deforming or collapsing the cell structure and causing a drop in physical properties, especially bond strength and compressive strength of the foam.

THE VACUUM RIBBON FEED DEVICE

Figure 6:
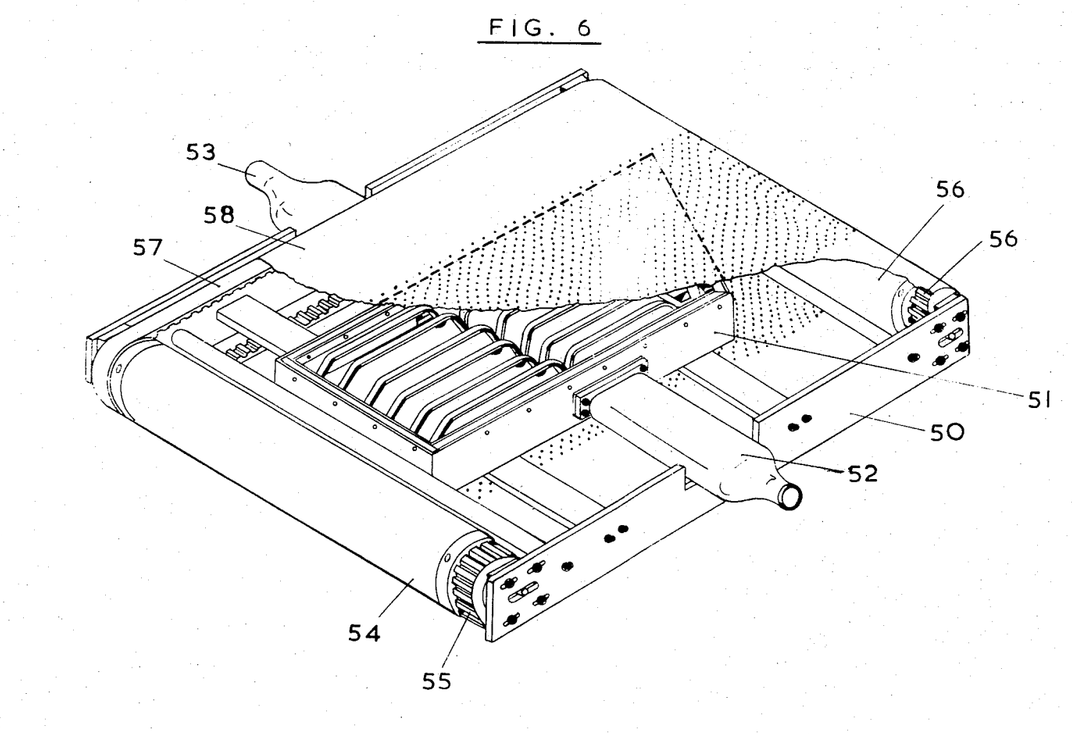
FIG. 6 is an enlarged perspective view, part cut-away, of one form of feed means for the flexible ribbon, identified generally by reference numeral 11 in FIGS. 2 and 3.

A suitable vacuum feed device for the foam-coated ribbon is now described in more detail and with reference to FIG. 6 of the accompanying drawings. In essence it comprises a porous endless belt (which is shown with part cut-away to expose the interior of the device) and means for applying vacuum to the underside of the belt on that part of its run in which it is intended to drive the ribbon forward, whereby the ribbon is held to the belt by suction.

In accordance with one embodiment, it comprises a frame 50 supporting an open-topped vacuum box 51. The top of the box is preferably trapezoid in plan as shown by the discontinuous lines, two opposing sides being substantially parallel to the long axis of the ribbon, a third side being substantially perpendicular thereto, and the fourth side being substantially parallel to the long axis of the workpiece to allow for maximum benefit to be obtained from the device as a means for guiding as well as feeding the ribbon. In an alternative and preferred embodiment (not illustrated), that end of the box intended to be positioned nearest the workpiece is covered by a plate one edge of which is arranged to define the top edge of the box at that end and to remain parallel to the long axis of the workpiece irrespective of the angle of the long axis of the ribbon thereto.

The vacuum box is provided with ports 52, 53 connected by tubes to a vacuum pump, not shown. At each end of the box along the line of the long axis of the flexible ribbon is mounted an axle 54 transverse to the long axis of the ribbon. Each axle bears a pair of toothed rollers 55, 56 (one of each pair being shown) and the rollers are rotatably mounted thereon by means of ball races. Each pair of toothed rollers supports a correspondingly toothed drive belt 57 (one is shown) and these in turn support an endless belt 58 of which at least that part of the width which covers the vacuum box is of porous or perforated material. Along its top run, the belt is arranged to rest snugly on the open top of the vacuum box. The edges of the open top of the vacuum box may be provided with vacuum seals to reduce vacuum leakage between them and the undersurface of the endless belt. Means may also be provided for supporting the endless belt during its travel over the open top of the vacuum box, for example by fitting the top of the box with a perforated or slotted lid or by providing a plurality of parallel longitudinal ribs in the box, as shown.

At least one of each pair of toothed rollers is driven by means not shown from a motor through a variable speed gear-box, e.g. a Kopp variator. Preferably, the drive is taken from the drive to the cage of the drive assembly for the workpiece and/or composite product through a variable speed gearbox (K), as indicated in FIG. 6, such that for any given ribbon width and outside diameter of the composite product (which together determine the setting for the variable speed gearbox K), the rate of forward movement of the ribbon may be synchronous with the rate of revolution of the workpiece (or composite product).

Preferably, the frame of the vacuum feed device is pivotable in the horizontal plane about the axis of the workpiece where the ribbon is fed onto it. Ideally, the pivot axis is the vertical axis which passes through the longitudinal axis of the workpiece and the centre line of the ribbon at the point where the ribbon is fed on to the workpiece. If the device is thus pivoted, both rate and angle of feed of the ribbon may be controlled by it, and that edge of the vacuum box intended to be parallel to the longitudinal axis of the workpiece, or substantially so, is positioned as near as possible to the vertical plane passing through that axis. Conveniently, the feed device is located on the table 4, as shown, which is pivoted about the desired axis.

For use with the ribbon drive device the machinery may also contain means responsive to incoming information consisting of the desired outside diameter (D) of the composite product and the effective width (w) of the ribbon (that is, the width of the ribbon less that used for overlap, if any) to set the required angle of feed of the ribbon ($\theta$) automatically in accordance with the relationship:

$$\cos \theta = w.(\pi D)^{-1}$$

While the top of the vacuum box is preferably trapezoidal in plan for the reasons given above, other cross-sectional shapes may also be used.

In operation, the angle of the vacuum feed device to the longitudinal axis of the workpiece is set in accordance with the relationship referred to above (e.g. by suitably adjusting the position of the table to which the device is attached, the ribbon is positioned on top of the endless perforated belt, vacuum is applied to hold the ribbon to the belt and the belt is put into motion at the appropriate speed having regard to the outside diameter of the product, the width of the ribbon and the rate of revolution of the workpiece, thereby driving the ribbon forward at the desired rate and angle.

THE FOAM DISPENSING UNIT

Figure 7:
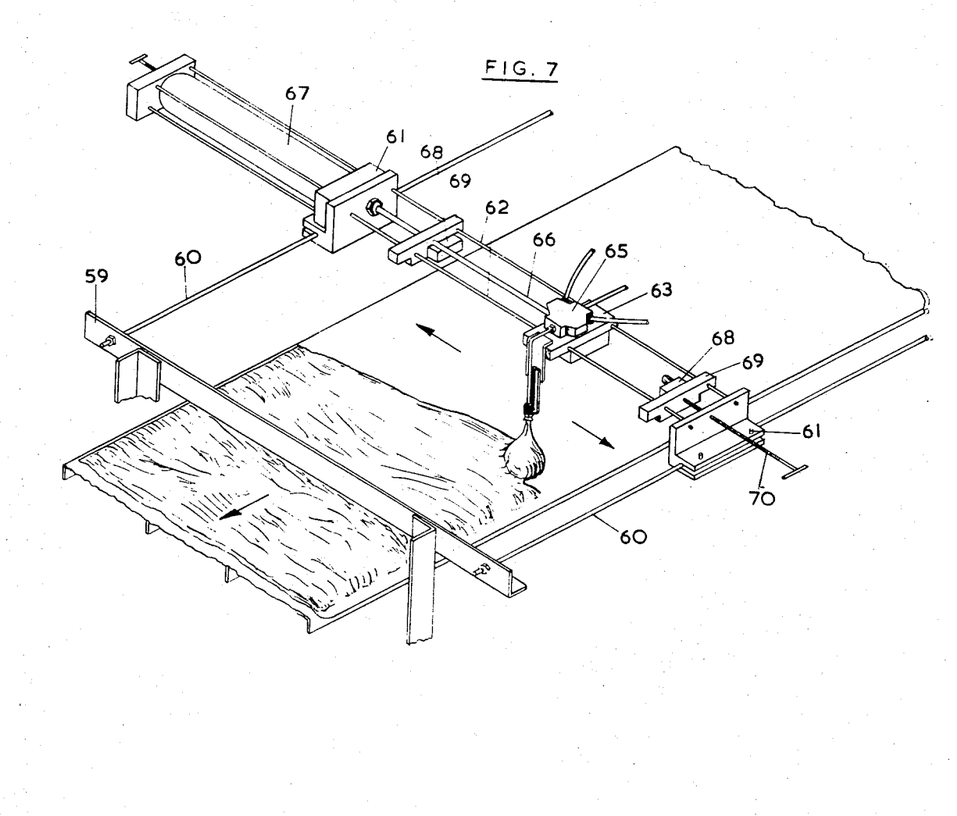
FIG. 7 shows in detail the construction of one form of foam dispensing unit for use in the machinery of FIGS. 2 and 3 and generally identified by reference numeral 8 in said figures.

One suitable form of foam dispensing unit, e.g. for use with a foamable mixture based on a curable plastic composition, e.g. polyurethane or polyisocyanurate, is now described in more detail and with the aid of FIG. 7. It comprises a frame 59 having mounted thereon a pair of parallel rails 60 arranged parallel with the direction of movement of the ribbon. Slidably mounted on, and lockable at any desired position along these rails are two slippers 61 linked by a second pair of rails 62 at right angles to the first pair, this last pair having slidably mounted thereon a sliding head 63, the arrangement of rails and slippers thus being such that the sliding head 63 is movable forwards and backwards across the width of the ribbon and the slippers 61 are movable in the direction of travel of the ribbon. The sliding head carries the foam dispensing nozzle 64 which is connected to a mixing head 65 adapted to receive and mix the separate components of the foamable composition. The sliding head is fixed to a piston 66 slidably mounted in cylinder 67 attached to slipper 61, and in operation reciprocated by air pressure or other suitable means. The travel of the sliding head is controlled by microswitches 68 carried by sliding blocks 69 whose positions are adjustable and lockable by means of screwed rods 70 threaded through slippers 61. The microswitches operate the air valves or the other means for reversing the travel of the piston 66 in cylinder 67.

A modified version of the machine of the invention, in which the tubular workpiece is generated in situ by helical winding of one or more plies, e.g. of paper or plastic, is now described in more detail with reference to one embodiment thereof and with the aid of FIG. 8.

Referring to FIG. 8, reference numerals 1 to 48, where given, have the same significance as in FIGS. 2, 3 and 4. 71 is a roll from which a flexible ply 72, e.g. of paper, may be withdrawn by a vacuum feed device 73 of the type described above and illustrated in FIG. 7. This device is mounted above the ribbon such that the vacuum is applied to the top surface thereof. It is supported by a frame pivotable about a vertical axis 74 which ideally passes through the centre line of the ribbon and the longitudinal axis of a mandrel 75 on to which the ribbon is fed at an angle of less than 90° to the axis thereof and about which it is wound to form helical windings 76. 77 is a roll of adhesive tape from which tape is fed on to the paper windings on the mandrel at the joints of the generated helices in order to bond them together to form a unitary tubular structure.

To aid the movement of the ply around and along the mandrel, it may be desirable for the mandrel to be tapered towards its tail and/or to provide a layer or cushion of fluid, e.g. air, between the mandrel and the ply. For example, compressed air may be supplied to the interior of the mandrel by a conduit and thence out through its surface by means of several passages through the wall. Alternatively, the mandrel may be hollow and porous (e.g. of sintered or perforated metal) and provided with a supply of compressed air to its interior.

Where the ply is of flimsy material such that the workpiece formed from it is not capable or scarcely capable of supporting itself, it will be desirable to support it while feeding on the coated ribbon and until the foam is sufficiently set for the composite product to be self-supporting. This may be achieved by arranging for the mandrel 77 to extend as far as or even beyond the ribbon winding station e.g. into the rotary drive unit 14. It is then especially desirable for the mandrel to be tapered and/or to provide a fluid layer or cushion between the ply windings and the mandrel surface because the application of the coated ribbon may tend to press the ply windings against the surface thus restricting their ease of motion along the mandrel.

Figure 9:
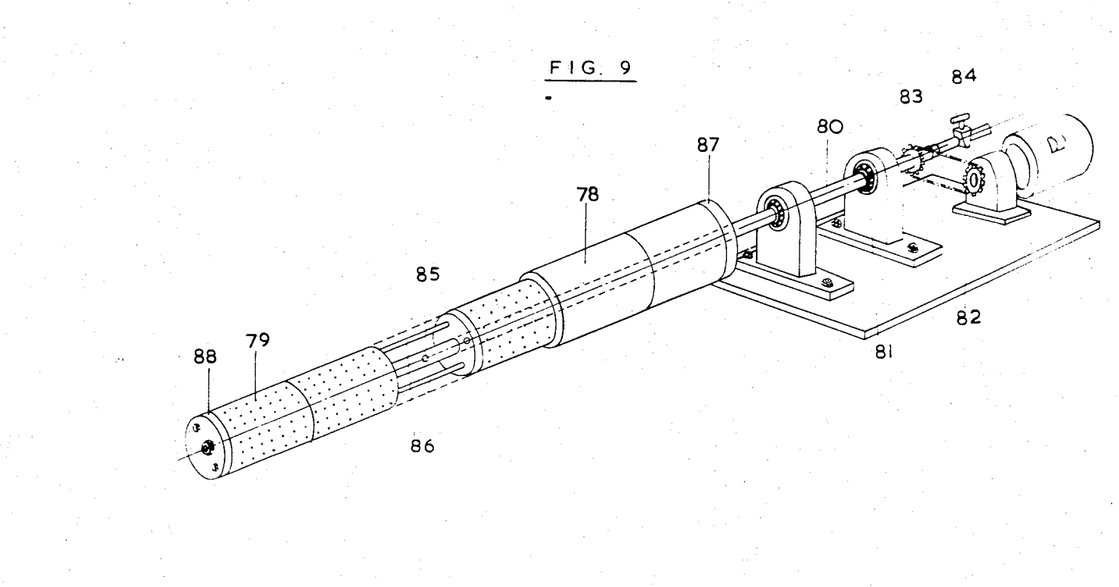
FIG. 9 is an enlarged isometric view of a mandrel suitable for use in the machine of FIG. 8.

One suitable form of mandrel will now be described in more detail with the aid of FIG. 9. The mandrel comprises a cantilevered shaft 80 rotatably mounted by means of ball races 81 on a frame 82. Slidably mounted on said shaft are a number of hollow cylindrical units, 78, 79. The cylindrical wall of each of those forming the tail (or unsupported) end of the mandrel is porous, e.g. of perforated metal while those of the head units 78 are impermeable and of slightly larger diameter e.g. 0.01 to 0.04 inch larger, than those forming the tail. There is thus formed a step between the head and the tail which defines an annular gap for a cushion of air provided from a compressed air supply and supplied through the porous walls of the tail units by means of a conduit 83 inside and running the length of the shaft 80, and ports 85 at points along the length of the conduit connecting with the hollow interior of the tail units. The conduit is provided with a valve 84 for controlling the compressed air supply and, in a preferred embodiment, the orifice of each port 85 is adjustable so as to be able to provide differential air pressure along the length of the tail.

The shaft may be rotated by power means, e.g. a variable speed motor, in which case at least the head units are arranged to rotate with the shaft. In the embodiment illustrated both head and tail units are arranged to rotate with the shaft by means of tie rods 86 running the length of the shaft and fixed to the flange 87. Alternatively, the units may be mounted to rotate with the shaft by friction, e.g. by clamping the units together by screwing on an end plate 88 which presses the units together and against the flange 87.

It will be readily be appreciated that by providing a series of sets of cylindrical head and tail units of appropriate dimensions, the length and diameter of the mandrel may be arranged to accommodate plies of various materials to form workpieces of various diameters. In a very convenient embodiment, the head part of the mandrel may comprise tail units with impermeable sleeves of the appropriate thickness fitted over them.

Cantilevered mandrels of the kind herein described are the subject of our copending British patent application No. 9,956/69.

In operation, the ply forming the workpiece is fed on to and round the head of the mandrel and adjacent ply windings are bonded together by adhesive tape. The foam coated ribbon is then fed on to the spirally wound workpiece being formed, preferably at a position such that at least part, but not all, of the width of the foam coated ribbon extends over the tail of the mandrel. With paper ply and foam coated paper or plastic ribbon, we have found air pressures between about 20 and 60 lbs./sq. in. suitable for the air cushion. Higher pressures tend to render the spiral winding of the ply difficult to control. The mandrel is rotated at a speed at least equal to the speed of rotation of the drive assembly for the product.

Where the ply is of relatively stiff material and the tubular workpiece wound from it substantially self-supporting, the mandrel 75 may be dispensed with. If desired, the ply may then be fed directly into the first rotary drive assembly 13 at such an angle that the tubular structure is generated within the unit. For use in this embodiment, it is preferred that the radially disposed impellers of this rotary drive assembly (the endless belts, for example) are so disposed and profiled as to proscribe a substantially uninterrupted circle.

In accordance with one method of putting into operation the process of our invention, the angle at which the coated ribbon is to be fed to the workpiece is determined and set, and the desired rates of linear and rotary motion of the workpiece and composite product and linear motion of the ribbon are calculated and set on the Kopp variators or corresponding speed-controlling devices. The workpiece to be sheathed is placed in position across the ribbon winding station and the ribbon is drawn by hand off its supply roll and under the foam dispenser. The foam dispenser is then started and the motor driving the vacuum feed device for the ribbon is started up, but leaving the clutch disengaged so that the drive assemblies are disconnected from the motor. The foam coated ribbon is guided along the table and on to the vacuum feed device and is then withdrawn from the vacuum feed device, fed under and round the workpiece and the free end fixed thereto at a suitable angle by any suitable means, e.g. adhesive tape. The two drive assemblies from the workpiece and composite product are then put into motion by engaging the clutch. In an alternative method, particularly suitable where the workpiece is being generated in situ by extrusion or by spiral winding of one or more plies, the rotary drive assembly and mandrel (where used) may be set in motion first and the ribbon passed round and applied to the workpiece while it is in motion.

As will be appreciated, many alternatives to and modifications of the processes and machinery specifically exemplified with reference to FIGS. 2 to 9 may be used without departing from the nature of the invention. Some are now mentioned.

More than one ribbon may be fed on to the workpiece and one or more of the ribbons may be coated with a foamable composition.

Each coated ribbon may have one or more than one coating of foam composition applied.

Reinforcement may be introduced by inclusion of fibres, wires, tapes or threads of metal, carbon, graphite, glass or plastic and the reinforcement may be applied longitudinally or helically and in one or more layers.

The workpiece may be treated, e.g. with a protective coating or an adhesive or a wetting agent, before the ribbon is applied.

The ribbon need not be flat but may be a complex cross-section, e.g. with ribs running along and/or across the ribbon, or with dimples.

The machinery may be adapted so that the workpiece moves upwards or downwards in or near the vertical plane rather than in the horizontal plane.

Filler materials other than foams may be used, and may be fibrous, granular, particulate or fluid (the last preferably with the workpiece moving in the vertical plane).

Depending on the nature of the workpiece, the filler material and the ribbon, and the presence or absence of other reinforcing or decorative additions, a wide variety of products having a wide range of properties and uses is obtainable from our process. Examples of uses are lagging, air ducting, hot water pipe, cold water pipe, sewage pipe and packaging.

What we claim is:

1. A process for the production of spirally wound products which comprises advancing a tubular workpiece along its longitudinal axis while rotating it about said axis, by positive drive feeding a flexible ribbon tangentially to the rotating advancing workpiece at a preselected rate and preselected angle of less than 90° to the longitudinal axis thereof such that the resultant spiral ribbon windings form a sheath enveloping a greater cross-sectional area than that of the workpiece, providing a filling material in the space between the workpiece and the spiral ribbon windings and bonding the spiral ribbon windings together or to the workpiece or both.

2. A process as claimed in claim 1, wherein the ribbon is fed to the workpiece by applying the under-surface of the ribbon by vacuum suction to an impeller.

3. A process as claimed in claim 1, wherein the workpiece forms an integral part of the composite product.

4. A process as claimed in claim 1, wherein the workpiece is formed continuously and in situ.

5. A process as claimed in claim 1, wherein the angle at which the ribbon is fed to the workpiece is not more than 75–80° and not less than 55° to the longitudinal axis thereof.

6. A process as claimed in claim 1, wherein the filling material is a synthetic foamable resin.

7. A process as claimed in claim 6, wherein the synthetic foamable resin is a rigid foam.

8. A process as claimed in claim 7 wherein the rigid foam is a polyisocyanurate foam.

9. A process as claimed in 1, wherein the spiral ribbon windings are bonded together and to the workpiece by means of the filling material.

10. A process as claimed in claim 1, wherein at least some but not all of the expansion of the foam is completed before the ribbon is fed on to the workpiece.

11. A process as claimed in claim 1, wherein the pressure exerted by the foam in the nip between the ribbon and the workpiece is continuously measured and the amount of foamable composition that is deposited per unit area of the ribbon is adjusted to maintain the pressure between predetermined limits.

12. A process as claimed in claim 1, wherein the filling material is provided in the space between the workpiece and the spiral ribbon windings by depositing a foamable composition on to the surface of the flexible ribbon at a point before the ribbon is fed on to the workpiece, and then feeding the ribbon to the workpiece with foamable composition between the ribbon and the workpiece.

13. A process as claimed in claim 12, wherein the surface of the ribbon is maintained substantially horizontal in its travel from the point at which the foamable composition is deposited on it to the point at which it is fed on to the workpiece.

References Cited
UNITED STATES PATENTS

| | | | |
|---|---|---|---|
| 3,376,180 | 4/1968 | Larson et al. | 156—287 X |
| 3,519,520 | 7/1970 | Newman | 156—287 X |
| 3,366,719 | 1/1968 | Lueders | 156—187 X |
| 3,563,825 | 2/1971 | Segura et al. | 156—187 |
| 3,594,246 | 7/1971 | Arovelius | 156—286 X |
| 3,616,008 | 10/1971 | Stump | 156—286 X |

WILLIAM A. POWELL, Primary Examiner

U.S. Cl. X.R.

156—192, 195, 429, 446